US 8,158,207 B2
Apr. 17, 2012

(12) United States Patent
Swidler

(10) Patent No.: US 8,158,207 B2
(45) Date of Patent: Apr. 17, 2012

(54) DURABLE MODIFICATION OF THE WETTING PROPERTIES OF A SURFACE

(75) Inventor: Ronald Swidler, Palo Alto, CA (US)

(73) Assignee: Cal-West Specialty Coatings, Inc., Sunnyvale, CA (US)

( * ) Notice: Subject to any disclaimer, the term of this patent is extended or adjusted under 35 U.S.C. 154(b) by 970 days.

(21) Appl. No.: 12/124,923

(22) Filed: May 21, 2008

(65) Prior Publication Data

US 2009/0101168 A1 Apr. 23, 2009

Related U.S. Application Data

(60) Provisional application No. 60/940,852, filed on May 30, 2007, provisional application No. 60/939,233, filed on May 21, 2007.

(51) Int. Cl.
*B05D 1/36* (2006.01)

(52) U.S. Cl. .............. 427/402; 427/407.1; 427/407.2; 427/407.3; 427/413; 427/415

(58) Field of Classification Search .............. 427/402, 427/407.1, 407.2, 407.3, 413, 415
See application file for complete search history.

(56) References Cited

U.S. PATENT DOCUMENTS

| | | |
|---|---|---|
| 4,559,151 A | 12/1985 | Pregozen et al. |
| 4,659,756 A | 4/1987 | Pohl |
| 4,663,159 A * | 5/1987 | Brode et al. ............. 424/70.13 |
| 4,980,067 A | 12/1990 | Hou et al. |
| 5,308,705 A | 5/1994 | Franz et al. |
| 5,328,768 A | 7/1994 | Goodwin |
| 5,697,991 A | 12/1997 | Frazer |
| 5,707,740 A | 1/1998 | Goodwin |
| 5,889,086 A | 3/1999 | Ushijima et al. |
| 6,001,485 A | 12/1999 | Kobayashi et al. |
| 6,461,537 B1 | 10/2002 | Turcotte et al. |
| 6,696,391 B2 | 2/2004 | Goto et al. |
| 6,991,852 B2 | 1/2006 | Carr et al. |
| 7,189,454 B2 | 3/2007 | Johnson et al. |
| 2003/0143335 A1 * | 7/2003 | Qiu et al. ............. 427/430.1 |

FOREIGN PATENT DOCUMENTS

WO WO/2008/144744 11/2005

OTHER PUBLICATIONS

PCT International Search Report and Written Opinion dated Oct. 27, 2008 issued in WO/2008/144744 [PCT/US2008/064395].
PCT International Preliminary Report on Patentability dated Nov. 24, 2009 issued in WO/2008/144744 [PCT/US2008/064395].

* cited by examiner

*Primary Examiner* — Eisa Elhilo
(74) *Attorney, Agent, or Firm* — Weaver Austin Villeneuve & Sampson LLP; Tom Hunter

(57) ABSTRACT

This invention provides compositions and methods to durably increase or decrease the wetting properties of a surface. In certain embodiments the methods utilize a polyquaternary ammonium compound to decrease wettability of the surface or a cationic polysaccharide to increase wettability of the surface.

77 Claims, No Drawings

DURABLE MODIFICATION OF THE WETTING PROPERTIES OF A SURFACE

CROSS-REFERENCE TO RELATED APPLICATIONS

This application claims priority to and benefit of U.S. Ser. No. 60/940,852, filed on May 30, 2007, and U.S. Ser. No. 60/939,233, filed on May 21, 2007, both of which are incorporated herein by reference in their entirety for all purposes.

STATEMENT AS TO RIGHTS TO INVENTIONS MADE UNDER FEDERALLY SPONSORED RESEARCH AND DEVELOPMENT

[Not Applicable]

FIELD OF THE INVENTION

The present invention relates generally to the art of surface treatments and, more particularly, to the art of producing durable modifications of a surface to impart or modify hydrophobicity or hydrophilicity.

BACKGROUND OF THE INVENTION

Alteration of the wetting properties of surfaces to render them more or less hydrophilic or hydrophobic has uses in a wide variety of contexts. Typically coatings that effectively alter the wetting properties of surfaces are temporary and easily removed by weather, washing, handling, and the like.

SUMMARY OF THE INVENTION

This invention provides formulations that durably modify the wetting properties of surfaces to which they are applied, especially anionic surfaces. In certain embodiments the formulations are water-beading formulations that increase the hydrophobicity of the underlying surface and, in some embodiments, can render the surface water repellant. Once applied the formulations durably alter the wetting properties of the surface(s) and the effect is typically not substantially altered by subsequent washing, handling, weather, and the like. In certain embodiments the surface altering materials are typically applied from an aqueous solution.

In certain embodiments the formulations are water-sheeting formulations that increase the hydrophilicity of the surface and thereby increase the wettability or water-sheeting quality of the surface.

In certain embodiments this invention provides methods of modifying the wetting properties of an anionic surface. The methods typically involve contacting the surface with an aqueous composition comprising a water miscible or water soluble polyquaternary ammonium compound compromising hydrophobic groups whereby said polyquaternary ammonium compound durably attaches to the anionic surface and imparts water repellency and/or reduces the wettability of the anionic surface. In certain embodiments the modified wetting properties of the anionic surface remain substantially unchanged after washing with an ammonia-based glass cleaner. In certain embodiments the modified wetting properties of the anionic surface remain substantially unchanged after at least 5 and/or at least 10 standard washes. In certain embodiments the increased water repellency (reduced wettability) is characterized by increased beading of water applied to the modified surface as compared to beading of water applied to the unmodified surface. In certain embodiments the anionic surface is a surface selected from the group consisting of a glass surface, a ceramic surface, a clay surface, a metal surface, a mineral or stone surface, an oxidized plastic surface. In certain embodiments the anionic surface is a glass surface comprising a window, a windshield, an airplane canopy, an optical lens, and the like. In certain embodiments the composition compromises an aqueous solution or mixture of the polyquaternary ammonium compound. In various embodiments the polyquaternary ammonium compound comprises a diquatenary ammonium compound, and/or a triquatenary ammonium compound, and/or a tetraquatenary ammonium compound, and/or a pentaquaternary ammonium compound. In certain embodiments solution or mixture is clear. In certain embodiments the solution or mixture further includes a detergent. In certain embodiments the solution or mixture has a pH in the range of from between about pH 3 to about pH 12, in certain embodiments about pH 4 to about pH 11, in certain embodiments, about pH 5 to about pH 10, in certain embodiments about pH 6 to about pH 9.0. Acidic versions of many of the formulations were found to have no negative effect on the performance of the compositions. Accordingly, the compositions are applicable to the currently popular acidic versions of many product categories i.e. Windex Vinegar, bathroom cleaners, and the like.

In certain embodiments the polyquaternary ammonium compound comprises a fatty polyquaternary ammonium compound. In certain embodiments the polyquaternary ammonium compound comprises $C_4$-$C_{30}$ hydrophobic group or a $C_8$-$C_{23}$ hydrophobic group.

In various embodiments the polyquaternary ammonium compound comprises a diquaternary ammonium compound of formula I or formula II, as described herein. In various embodiments the polyquaternary ammonium compound comprises tallowalkylpentamethyl propylenediammonium dichloride or N-ethyl ether-bis-1,4(N-isostearylamidoproply-N,N-dimethyl ammonium chloride. In certain embodiments the polyquaternary ammonium compound comprises a substituted polyquaternary ammonium compound, where the substituent is a polyethylene oxide. In various embodiments the composition comprises about 0.001% to about 10% the polyquaternary ammonium compound. In certain embodiments the composition comprises less than about 1% of the polyquaternary ammonium compound. In certain embodiments the composition further comprises an additional surfactant. In certain embodiments the composition further comprises a detergent and/or an alcohol and/or a colorant. In certain embodiments the surface does not comprise the surface of a hair or skin, a textile, or a paper or cardboard. In certain embodiments the composition is applied to a glass surface in a vehicle by delivery through a windshield washing system, through a sponge, or through a spray bottle. In certain embodiments the composition is applied to a glass surface of a building.

In various embodiments this inventions provides methods of modifying the wetting properties of an anionic surface, the method comprising contacting the surface with an aqueous composition comprising a cationic polysaccharide whereby the cationic polysaccharide compound durably attaches to the anionic surface and increases the wettability of the anionic surface. In certain embodiments the cationic polysaccharide is selected from the group consisting of a cationic starch, a cationic dextrin, a cationic cellulose, and a cationic galactomannan gum. In certain embodiments the cationic polysaccharide comprises a cationic starch or dextrin. In certain embodiments the cationic polysaccharide is selected from the group consisting of cationic amylopectin,2 hydroxy-3-trimethylammonium orpyl ether chloride (National Starch Cato 237), Guar Hydroxypropyltrimonium Chloride (Rhone Poulenc Jaguar C-17), cationic amylopectin,2-hydroxy-3-trimethylammonium orpyl ether chloride (National Starch Cato 237), and cationic cellulose (CelQuat H-100). In various embodiments the modified wetting properties of the anionic surface remain substantially unchanged after at least 5 or at least 10 standard washes. In certain embodiments the increased wettability is characterized by increased sheeting and/or more uniform sheeting of water applied to the modified surface as compared to sheeting of water applied to the unmodified surface. In various embodiments the anionic surface is a surface selected from the group consisting of a glass surface, a ceramic surface, a clay surface, a metal surface, a mineral or stone surface, and an oxidized plastic surface. In certain embodiments the anionic is a glass surface comprising a window, a windshield, an airplane canopy, an optical lens, and the like. In certain embodiments the composition compromises an aqueous solution or mixture of the cationic polysaccharide. In various embodiments the composition compromises an aqueous solution or mixture of the cationic polysaccharide and the cationic polysaccharide comprises 0.01 to about 10% of the composition. In various embodiments the composition further comprises a surfactant that comprises less than about 20% of the composition. In various embodiments the composition comprises a surfactant that is a non-ionic surfactant, a cationic surfactant, or an anionic surfactant. In various embodiments the composition further comprises a pH adjuster (e.g., a base). In certain embodiments the composition comprises: a cationic starch or dextrin; a surfactant; and a pH adjuster. In certain embodiments the cationic starch or dextrin comprises about 0.01 to about 3% of the composition. In certain embodiments the surfactant comprises less than about 0.3% of the composition. In certain embodiments the pH adjuster sets the pH of the composition from about pH 8 to about pH 12. In certain embodiments the composition further comprises a detergent and/or an alcohol and/or a colorant. In certain embodiments the surface does not comprise the surface of a hair or skin, a textile, or a paper or cardboard.

Also provided are compositions for modifying the wetting properties of an anionic surface. The compositions typically comprise an aqueous mixture or solution comprising: a cationic polysaccharide; and a surfactant. In certain embodiments the composition further comprises a pH adjuster (e.g., a base) and/or a colorant and/or an alcohol.

Also provided is an article of manufacture (e.g. a window, bumper, windshield, canopy, optical device, etc.) comprising an anionic surface having durably attached thereto a water soluble or water miscible cationic polysaccharide, whereby the polysaccharide increases the wettability of the anionic surface. In certain embodiments the cationic polysaccharide comprises a cationic starch and/or a cationic dextrin.

Also provided is an article of manufacture (e.g. a window, bumper, windshield, canopy, optical device, etc.) comprising an anionic surface having durably attached thereto a water miscible or water soluble polyquaternary ammonium compound compromising hydrophobic groups whereby the polyquaternary ammonium compound durably attaches to the anionic surface and reduces the wettability of the anionic surface. In certain embodiments the polyquaternary ammonium includes any of the polyquaternary ammonium compounds described herein. In certain embodiments the modified wetting properties of the anionic surface(s) remain substantially unchanged after at least 5 or at least 10 standard washes. In various embodiments the surface of the article of manufacture comprises a surface selected from the group consisting of a glass surface, a ceramic surface, a clay surface, a metal surface, a mineral or stone surface, and an oxidized plastic surface. In certain embodiments the anionic surface comprises a metal, a metal oxide, a pigment, an oxidized plastic.

In certain embodiments the methods and compositions of the present invention expressly excludes one or more of the quaternary ammonium compounds disclosed in U.S. Pat. No. 6,461,537 and/or in PCT application WO 99/34933, which are incorporated herein by reference. In certain embodiments, the methods and compositions expressly exclude one or more of Silquat D10-B (low mol. wt. silicone quat.), Siltech NS SAQ. (alkyl amido dimethyl quat.), Silquat J 15-NO (high mol. wt. silicone quat.), dialkyl amido amine quat., SilquatJ1S-NO (high mol. wt. silicone quat.), Silquat J15-B (high mot wt. silicone quat.), Silquat J15-D (high mol. wt. silicone quat.), Silquat 115-D-60 (high mol. wt. silicone quat.), dialkyl diamido quat., dialkyl imidazoline quat., alkyl dimethyl benzyl quat., dialkyldimethyl quat., alkyl trimethyl quat., or Siltech 115-B (high mol. wt. silicone quat.). In certain embodiments the surface whose wetting properties is changed is not a paper, cardboard, or textile.

Definitions

The terms "anionic surface" refers to a surface that bears negative charges in its "native" state or that can be derivatized or functionalized to bear negative charges. Anionic surfaces include, but are not limited to surfaces of glass, metals, ceramics, minerals, oxidized plastics.

In certain embodiments a "standard wash" as used herein with reference to washing a surface treated with a water-beading formulation refers to washing (without abrasion) with tap water (about 60-80 degrees F.) dispensed under moderate (about 40-50 psi) pressure from a hand held lab sink spray head nozzle for about 5 seconds. In certain embodiments a standard wash for a water-sheeting surface refers to washing (without abrasion) with tap water (about 60-80 degrees F.) dispensed under moderate (about 40-50 psi) pressure from a hand held lab sink spray head nozzle for about 10 to about 30 seconds. In certain embodiments, a more stringent standard wash comprises washing of a surface with a glass cleaner (e.g., an aqueous solution of TOMADOL® 25-12 (0.05%), TOMADOL® 25-3a (0.10%), ammonia (0.15%), and isopropyl alcohol (5.00%)) without abrasion, for a period ranging from about 5 to about 30 seconds.

The term "reducing the wettability" of a surface indicates that the surface becomes more hydrophobic. This can be quantified as an increase in the contact angle formed by droplets of distilled water applied to the surface. In certain embodiments the reduced wettability is actually water-repellency.

The term "increasing the wettability" of a surface indicates that the surface becomes more hydrophilic. This can be quantified as a decrease in the contact angle formed by droplets of distilled water applied to the surface.

The term "water-beading" refers to water taking the form of beads or droplets on a surface.

"Water repellency" refers to the tendency of a surface to repel or shed water. Water on such a surface typically forms beads or droplets often joining together to make 'rivers' if under the influence of gravity or air movement.

"Water-sheeting" refers to the formation of a thin sheet of water across a surface/substrate. As the thin film of water retreats from the surface it typically retreats evenly without forming droplets as the water retreats/evaporates from surface.

"Durable water-beading" indicates that the water-beading effect is not significantly reduced after 1, preferably after 2, more preferably after 3, or even after 4 or separate 'challenges' with glass cleaner (a glass cleaner (e.g., an aqueous solution of TOMADOL® 25-12 (0.05%), TOMADOL® 25-3a (0.10%), ammonia (0.15%), and isopropyl alcohol (5.00%)) without abrasion).

BRIEF DESCRIPTION OF THE DRAWINGS

[Not Applicable]

DETAILED DESCRIPTION

This invention provides compositions and methods of durably altering the wetting properties of surfaces. In certain embodiments, formulations are provided that increase the hydrophobicity of a surface and thereby increase water beading on that surface. These are referred to herein as "water-beading" formulations. In other embodiments, formulations are provided that decrease the hydrophobicity of a surface and thereby increase water "sheeting" off of that surface. These are referred to herein as "water-sheeting" formulations.

In either case, the surface modification is durable. The surface(s) can be washed one or more times, preferably five or more times, more preferably 10 or more, 15 or more, 20 or more or 30 or more times with no substantial change in the altered wettability of that surface.

The formulations are effective to modify the wetting properties of a wide number of surfaces. Suitable surfaces include essentially any anionic surface. Suitable anionic surfaces include surfaces that bear negative charges, e.g., in their native state, after cleaning, and/or after exposure to environmental conditions. Illustrative anionic surfaces include, but are not limited to glass, ceramic or clay, metals, oxidized plastic surfaces (e.g. plastics treated for printing, electrodeless plating, etc.), surfaces coated with oxidized pigments, surfaces derivatized with negatively charged groups, and the like.

The formulations described herein are useful in wide variety of contexts. Thus, for example, the water-beading formulations are useful to improve visibility through windshields, in rainstorms, to improve the efficacy of wiper blades, to improve the removal of soiling materials from such surfaces, to improve the "receptivity" of such surfaces to the subsequent application of hydrophobic materials, and the like. Indeed, the water-beading formulations are useful in essentially any application where it is desired to reduce the wettability of the underlying surface or to even render the surface hydrophilic. Thus, for example, these formulations can also be used to prevent fogging of surfaces (e.g., windows, windshields, shower doors, eyeglasses, etc.), as antistatic agents (e.g., for TV screens, computer screens, etc.), in glass and/or tile cleaners (e.g. bathroom cleaners), and the like. In certain embodiments the compositions can be used as an adhesion promoter/coupling agent between oil based adhesives and polar anionic surfaces.

Similarly, the "water-sheeting" formulations find application where it is desired to increase the wettability of an underlying surface. These formulations have proven effective to impart durable "water-sheeting" characteristics to surfaces. The treated surfaces are resistant to soiling and readily cleaned. Indeed, soiling agents comprising oils or oily residues are readily released from such surfaces using a simple water wash. In addition, these agents are well suited for use in conjunction with agents whose activity is improved by effective wetting of the underlying surface. Thus, for example, the "water-sheeting" formulations can improve wetting of the underlying surface by certain paints, by adhesives, and the like. The "water-sheeting" formulations are also useful in the treatment of windows, mirrors, and other glass, ceramic, or tile surfaces, in the formulation of glass or bathroom cleaners, and the like.

In various embodiments the compositions can be used to render energetically treated plastic surfaces (e.g. corona, RF etc.) permanently or durably hydrophilic thereby facilitating the application of, e.g., water based primers and such to plastic automotive bumper covers and other plastic surfaces. The technology can thus be used to prolong the effect of activated surface treated plastics thereby providing longer term shelf life and robustness of the activated surface. Many plastic painting/plating operations are very sensitive to variations in the activated treatment process and post process environment. "Protection" with the composition provides for better durability and reliability of the treatment resulting in fewer defects.

Water-Beading Formulations.

The water-beading formulations typically comprise, as a principle active ingredient, one or more water miscible and/or water-soluble polyquaternary ammonium compounds compromising hydrophobic groups. In certain embodiments the hydrophobic group comprise $C_8$-$C_{25}$ hydrophobic groups (e.g., alkyls, heterocycles, etc.), siloxanes, alkylsilanes, and the like. It was a surprising discovery that, in contrast to monoquaternary ammonium compounds which are readily washed/rinsed off of ionic surfaces, polyquatenary ammonium compounds durably attach to the underlying surface and are resistant to removal even after many washing operations.

While the discussion below focuses on polyquatemized ammonium compounds, it will be appreciated that polyquaternized pyridines, polyquatemized imidazolium compounds, polyquatemized phosphonium compounds, and the like can also be used.

In certain embodiments the polyquaternary ammonium compounds are selected that chemisorb to the underlying surface providing multiple "attachments" (e.g. ionic or electrostatic bonds) to the underlying surface for each molecule and present a hydrophobic portion of the molecule (e.g., a hydrophobic tail) disposed away from the underlying surface. In certain embodiments suitable polyquaternary ammonium compounds include, but are not limited to diquaternary ammonium compounds, triquaternary ammonium compounds, tetraquaternary ammonium compounds, pentaquaternary ammonium compounds, and the like bearing one or more hydrophobic tails.

One illustrative suitable diquaternary ammonium compound is shown by Formula I:

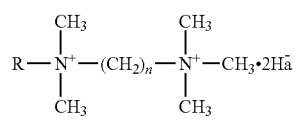

where n is 1, 2, 3, 4, 5, or 6; Ha— is a counterion (e.g., a halide), and R is a $C_8$-$C_{22}$ alkyl, a $C_8$-$C_{22}$ perfluoralkyl, a tallow, a tallow derivative (e.g. 50% steryl and 50% oleyl), a polyethylene oxide, alkybenzyl, a siloxane, an alkylsilane, and the like. In certain embodiments the diquaternary ammonium compound comprises tallowalkylpentamethyl propanediammonium dichloride (Duoquad T/50, Azko).

Another illustrative polyquaternary ammonium compound is shown by Formula II:

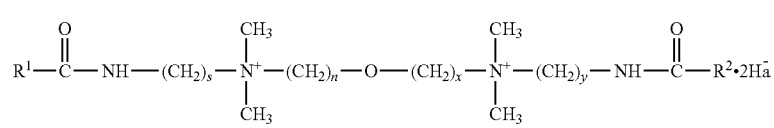

where s, n, x, and y are independently 1, 2, 3, 4, 5, or 6; Ha is a counterion (e.g., a halide such as Cl), and $R^1$ and $R^2$ are independently selected from the group consisting of a stearyl, a $C_8$-$C_{22}$ alkyl, a $C_8$-$C_{22}$ perfluoralkyl, a tallow, a tallow derivative e.g., 50% steryl, and 50% oleyl), and the like. It will also be appreciated that, in certain embodiments, any one or more of the methyl groups can be replaced other substituents, e.g., H, OH, alky, etc. In certain embodiments molecules containing a plurality of quaternary groups attached to hydrophilic chains are efficacious in this application. In certain embodiments the polyquaternary ammonium compound is a bis isostearamidopropyl ethoxyethyl dimoniium halide (e.g., bis isostearamidopropyl ethoxyethyl dimoniium chloride (FoamQuat 21AE)).

In various embodiments the polyquaternary ammonium compounds comprise substituted polyethylene imines of the type:

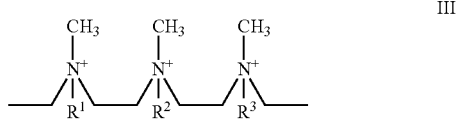

III where $R^1$, $R^2$, and $R^3$ are selected from the group consisting of $C_8$-$C_{22}$ alkyl, $C_8$-$C_{22}$ hydroxyalkyl, heterocycle, and the like.

When formulated for application to a surface (e.g., glass, metal, ceramic, tile, etc.) as a water-beading formulation, the polyquaternary ammonium compounds are formulated in an aqueous mixture, suspension or solution. Typically the polyquaternary compound will be present in an amount ranging from about 0.001% to about 10% of the aqueous formulation, preferably from about 0.01% to about 5% of the aqueous formulation, more preferably from about preferably from about 0.05% to about 3%, or about 2%, or about 1% of the aqueous formulation.

Water-Sheeting Formulations.

The water-sheeting formulations typically comprise, as a principle active ingredient, one or more water miscible and/or water-soluble cationic polysaccharides. Suitable cationic polysaccharides include, but are not limited to cationic starches, cationic dextrins, cationic celluloses, cationic galactomannan gums, and the like. In certain embodiments, cationic starches (e.g., CATO-237, CATO-235, from National Starch and Chemical Company Bridgewater, N.J.) are particularly preferred.

The repeating unit of starch is glucose, having a carbohydrate monomer composition of $C_6H_{12}O_6$. In the polymer each unit has three —OH groups, and the units are linked together with flexible alpha-1-4 glycocidic bonds. Cationic starches can be produced by treating a slurry of partially swollen granules of starch with a reactive compound. An example of such a reagent is epoxypropyltrimethylammonium chloride. This reagent contains a quaternary nitrogen, yielding a positive charge that is independent of pH. The reagent usually attaches to the starch at the $C_6$ position, the most accessible of the —OH groups. In various embodiments the typical level of derivatization is one to two charged groups per hundred glucose units.

Cationic starch derivatives such as cationic dextrins are also useful in the formulation of water-sheeting compositions. In various embodiments, cationic dextrins are selected that have molecular weights (as dextrins) in the range from about 1,000 to about 10,000. In various embodiments the D.S. is in the range from 0.1 upwards, especially from about 0.2 to 0.8.

Other cationic polysaccharides are described in U.S. Pat. No. 6,958,325, which is incorporated herein by reference. The cationic polysaccharides described therein typically have from 2 to 2000 saccharide units with typically at least one oligoamine directly grafted to the polysaccharide chain per each segment of 5 saccharide units. In various embodiments the oligoamine can be selected from the group consisting of a linear, branched and cyclic alkyl amine having at least two amino groups, and at least one further grafted group selected from the group consisting of a hydrophobic and an amphiphilic group directly grafted to the polysaccharide chain per each segment of 50 saccharide units, where said hydrophobic or amphiphilic group includes an aliphatic chain of at least 4 carbons atom.

Cationic polysaccharides also include cationic celluloses and cationic galactomannan gums. Among the cationic polysaccharides that maybe mentioned, for example, are cellulose ether derivatives comprising quaternary ammonium groups and cationic cellulose copolymers or cellulose derivatives grafted with a water-soluble quaternary ammonium monomer and cationic galactomannan gums.

Certain cationic polysaccharides, include, but are not limited to copolymers of hydroxyethylcelluloses and diallyldimethyl ammonium chlorides, examples of which include polymers known via the INCI nomenclature as Polyquaternium-4, such as the products sold under the name Celquat L 200 and Celquat H 100 by the company National Starch.

Certain cationic polysaccharides, include, but are not limited to copolymers of hydroxyethylcelluloses and a trimethyl ammonium substituted epoxide, examples of which include polymers known via the INCI nomenclature as Polyquaternium-10, such as the products sold under the name AEC Polyquaternium-10 by the company A&E Connock, Catinal C-100 Catinal HC-35 Catinal HC-100 Catinal HC-200 Catinal LC-100 Catinal LC-200 by the company Toho, Celquat SC-240C Celquat SC-230M, by the company National Starch, Dekaquat 400, Dekaquat 3000 by the company Dekker, Leogard GP by the company Akzo Nobel, RITA Polyquta 400 RITA, Polyquta 3000 by the company RITA, UCARE Polymer JR-125 UCARE Polymer JR-400 UCARE Polymer JR-30M UCARE Polymer LK UCARE Polymer LR 400 UCARE Polymer LR 30M by the company Amerchol.

Certain cationic polysaccharides, include, but are not limited to copolymers of hydroxyethylcelluloses and lauryl dimethyl ammonium substituted epoxides, examples of which include polymers known via the INCI nomenclature as Polyquaternium-24, such as the products sold under the name Quatrisoft polymer LM-200 by the company Amerchol.

Certain cationic polysaccharides, include, but are not limited to derivatives of hydroxypropyl guar, examples of which include polymers known via the INCI nomenclature as guar hydroxypropyltrimonium chloride, such as the products sold under the name Catinal CG-100, Catinal CG-200 by the company Toho, Cosmedia Guar C-261N, Cosmedia Guar C-261N, Cosmedia Guar C-261N by the company Cognis, DiaGum P 5070 by the company Freedom Chemical Diamalt, N-Hance Cationic Guar by the company Hercules/Aqualon, Hi-Care 1000, Jaguar C-17, Jaguar C-2000, Jaguar C-13S, Jaguar C-14S, Jaguar Excel by the company Rhodia, Kiprogum CW, Kiprogum NGK by the company Nippon Starch.

Certain cationic polysaccharides, include, but are not limited to hydroxypropyl derivatives of guar hydroxypropyltrimonium chloride, examples of which include polymers known via the INCI nomenclature as Hydroxypropyl Guar Hydroxypropyltrimonium Chloride, such as the products sold under the name Jaguar C-162 by the company Rhodia.

The cationic polysaccharides described herein are intended to be illustrative and not limiting. Using the teaching provided herein, other pH adjusters (e.g., bases, basic buffers, etc.) will be known to those of skill in the art.

When formulated for application to a surface (e.g., glass, metal, ceramic, tile, etc.) as a water-sheeting formulation the cationic polysaccharides are formulated in an aqueous mixture, suspension or solution. Typically the cationic polysaccharides will be present in an amount ranging from about 0.001% to about 10% of the aqueous formulation, preferably from about 0.01% to about 5% of the aqueous formulation, more preferably from about preferably from about 0.05% to about 3%, or about 2%, or about 1% of the aqueous formulation.

In various embodiments, the water-sheeting formulations are well suited in the manufacture of glass cleaning compositions. Illustrative glass cleaning compositions are shown in Table 1 and 2.

TABLE 1

Illustrative water sheeting glass cleaning composition.

| Component | Chemical | Maker | active ingredient |
|---|---|---|---|
| leveling, coupling and foaming agent (e.g., ammonium laureth sulfate) | Steol CA-460 | Stepan | 0.10% |
| Cationic polysaccharide | Cato 237 | National Starch | 0.1-0.2% |
| Alcohol | Isopropanol | | 2.00% |
| Ammonia | Ammonia | | 0.05% |
| Ethylene and/or Propylene Glycol Ethers | Arcosolve PTB | Lyondell | 0-2.0% |
| | Water | | balance |

TABLE 2

Illustrative water sheeting glass cleaning composition.

| Component | Chemical | Maker | active ingredient |
|---|---|---|---|
| surfactant (e.g., nonionic) | Tomadol 91-6 | Tomah Products | 0.10% |
| Cationic polysaccharide | Cato 237 | National Starch | 0.1-0.2% |
| Alcohol | Isopropanol | | 2.00% |
| Ammonia | Ammonia | | 0.05% |
| Ethylene and/or Propylene Glycol Ethers | Arcosolve PTB | Lyondell | 0-2.0% |
| | Water | | balance |

The water-sheeting and water-beading formulations, glass cleaners, and the like are intended to be illustrative and not limiting. Using the teaching provided herein other water-sheeting, water-beading formulations and/or glass cleaners and the like will be readily appreciated by one of skill in the art.

Surfactant

In various embodiments, the water-beading and/or water-sheeting formulations, in addition to the principle active ingredient, can optionally additionally include one or more surfactants. Suitable surfactants include ionic surfactants (cationic or anionic), nonionic surfactants, amphoteric surfactants, and the like.

Examples of suitable nonionic surfactants include various ethoxylated alcohols (alcohol ethoxylates). Such ethoxylated alcohols, include but are not limited to monoethers of polyethylene glycols and long chain alkanols in which the alkanol has 10 to 16 carbon atoms and the polyethylene glycol has 5 to 15 oxyethylene units. Such monoethers of polyethylene glycol are generally made by reacting an alkanol with ethylene oxide. Such nonionic surfactants are well known to those of skill in the art and are commercially available. For example, commercially available TOMADOL® 25-7, a nonionic surfactant, is an adduct of 7 mols of ethylene oxide and 1 mol of a mixture of alkanols of 12 to 15 carbon atoms. Other related nonionic surfactants include TOMADOL® 25-3, TOMADOL® 4511, TOMADOL®2503, ALFONIC® 1618-65, PLURAFAC® B26, and the like. In certain embodiments the alcohol ethoxylate comprises RHODASURF® TDA-8.5 available from Rhodia in Cranbury, N.J. (USA).

Other suitable surfactants include sugar ester based surfactants (e.g., alkyl polyglucosides, and the like). For example, a line of Cognis Corporation Sugar Ester based "green" surfactants including Glucopon 225DK, 425N and 625UP were obtained for compatibility testing. These surfacts functioned well replacing previously tested surfactants and allowing the ability to formulate with "green" surfactant technologies.

Ionic surfactants include anionic and cationic surfactants. Suitable anionic surfactants are well known to those of skill in the art and include, but are not limited to various carboxylates, N-acylsarcosinates, acylated protein hydrolysates including various sulfonates, ethoxylated and/or sulfonated alkylphenols, and the like. Cationic surfactants are also well known to those of skill in the art. Ethoxolated fatty amines (e.g. ethomines) are useful in this context in as much as they are water soluble.

Suitable amphoteric surfactants include, but are not limited to, the alkylbetaines, alkyldimethylamines, amphoteric imidazolinium derivatives, and the like.

In certain embodiments, the surfactant includes two nonionic surfactants, one a low hydrophile-lipophile balance (HLB) surfactant and the other a high (HLB) surfactant. (The hydrophile-lipophile balance is an expression of the relative simultaneous attraction of surfactant for water and for oil [or for the two phases of the emulsion system being considered]). The high HLB surfactant then acts as an emulsifier effectively solubilizing the HLB surfactant. In a certain embodiments, nonionic low HLB and high HLB surfactants are combined with a high foaming ionic surfactant which provides foam height and helps lift abraded particles, dirt and oil up away from the underlying surface.

As used herein, a low HLB surfactant is one which has an HLB number ranging from about 3 to about 8, while a high HLB surfactant is one which has an HLB number ranging from about 9 to about 2.

In certain embodiments, the surfactant comprises TOMADOL® 25-3 (Tomah, Inc.) as the low HLB surfactant (HLB number about 7.8) and TOMADOL® 25-7 (Tomah, Inc.) as the high HLB surfactant (HLB number about 12.3) and RHODAPLEX® CO 436, sodium dodecyl sulfate, dioctylsodiumsulfosuccinate (e.g., ACROSOL® OT-75), STEOL® CA-460, or STEOL® CS-460 as the high foaming surfactant. Other suitable high HLB, low HLB and high foaming surfactants will be known to those of skill in the art.

Also suitable is TRITON® X-100 ($C_{14}H_{22}O(C_2H_4O)_n$ where the average number of ethylene oxide units per molecule is around 9 or 10) and surfactants having fluorinated alkyl chains such as "FLUORAD®" products sold by Minnesota Mining and Manufacturing (St. Paul, Minn., U.S.A.) and "ZONYL®" products sold by DuPont Company (Wilmington, Del., U.S.A.) are also suitable. In addition, many embodiments can include polyethoxy adducts or modified (poly)ethoxylates such as TRITON® DF-12 and DF-16 sold by Union Carbide (Danbury, Conn., U.S.A.). Other surfactants include nonylphenoxypolyethanol (such as IGEPAL CO-660 made by GAF), polyoxyalkylene glycol (such as MACOL® 18 and 19 made by Mazer Chemicals), acetylenic diol-based surfactants (such as SURFYNOL® 104 made by Air Products), and the like.

In various embodiments the surfactant(s) comprise one or more silicone surfactants. Such surfactants include, but are not limited to silicone polyoxyalkylene copolymers, organosilicone-polyether copolymer surfactants, and the like. Such surfactants include, but are not limited to various dimethicone surfactants such as PEG-11 methyl ether dimethicone (e.g., GRANSURF® 71), PEG-10 dimethicone (e.g., GRANSURF® 77), stearoxymethicone/dimethicone copolymer (e.g., GRANSIL® ST-9), and the like. In certain embodiments, preferred siloxane-based surfactants include BYK® surfactants (e.g., BYK-345, BYK346, BYK-347, BYK-348, and the like) available from BYK Chemie GmbH (West Germany). Other silicone surfactants can be identified for example in Hill (1999) Silicon Surfactants, Marcel Decker, New York.

In certain preferred embodiments, the surfactant comprises a linear fatty alcohol ether sulfate (e.g., $CH_3(CH_2)_{10}CH_2(OCH_2CH_2)_3OSO_3NH_4$ available as STEOL® CA-460 from Stepan).

In various embodiments, the total surfactant comprises about 0.001% to about to about 6.0%, more preferably about 0.01 to about 3.0% and most preferably about 0.1% to about 2.0% or about 0.1 to about 0.5% of the water-beading or water-sheeting formulation at the time of application to the surface. If present, the high and low HLB surfactants are preferably present in equal concentration with the concentration of each ranging from about 0.001% to about 2%, more preferably about 0.001% to about 1% and most preferably about 0.001% to about 0.5% of the total composition. If present, the high foaming surfactant is preferably present in a concentration equivalent to the combined high and low HLB surfactants, with a concentration preferably ranging from about 0.001% to about 2%, more preferably from about 0.001% to about 1.5%, and most preferably from about 0.001% to about 1% of the total composition.

pH Adjusters.

In various embodiments the water-beading and/or water-sheeting formulations can additionally comprise one or more pH adjusters. pH adjusters, when present, can be selected to render the surface more basic and thereby speed up the chemisorption of the principle active ingredient(s) of the formulation. Typically, in various embodiments, the use of a base will neutralize acidic functional groups that comprise or are adsorbed to the surface and thereby facilitate the creation of a highly anionic surface.

Suitable pH adjusters include but are not limited to ammonia, ethanolamines, alkyl amines, sodium hydroxide, sodium bicarbonate, and the like.

When present, the pH adjusters typically comprises about 0.01 to about 10% or 5% of the aqueous formulation, preferably about 0.1 to about 5% of the aqueous formulation, more preferably from about 1% to about 3% of the aqueous formulation.

The pH adjusters described herein are intended to be illustrative and not limiting. Using the teaching provided herein, other pH adjusters (e.g., bases, basic buffers, etc.) will be known to those of skill in the art.

Abrasives and "Paste" Formulations.

Various gel and/or paste formulations including one or more particulate abrasives provide a method of modifying a surface while abrading contaminates away and/or adding "tooth" for mechanical adhesion. The benefit would include improved chemical and mechanical adhesion of subsequent coatings such as in a plating, prime or painting operation. Various suitable abrasives include, but are not limited to pumice, calcium carbonate, aluminum oxide, emery, silicon carbide, feldspar, nepheline syenite, silica microparticles, ninex, boron nitride, metal carbides, diamond dust, iron oxide, and the like.

Certain paste formulations (see, e.g., Example 5) including calcium carbonate provided a good way to scrub clean a surface and deposit the sheeting at the same time, such as on ceramic bathroom tiles, stainless steel, aluminum, glass and the like. Calcium carbonate is a non scratching abrasive used as the basis for hard surface cleansers such as Bon-Ami and was particularly effective in the past formulations described in Example 5.

In certain embodiments particulate abrasives are used that have a mohs hardness of about 9 or greater. In certain embodiments the particulate abrasive comprises fused aluminum oxide (e.g., MINSPAR 3™). In certain embodiments the particulate abrasive has a particle size and hardness sufficient to dull a paint finish on a plastic or metal surface (e.g., a surface of a plastic automobile part such as an automobile bumper or other part) or to remove part or all of an oxide layer on such a surface. In various embodiments the surface can be bare metal, oxidized metal, metal already coated with a primer or undercoat, or metal coated with a final or finish coat. Similarly, suitable plastic or rubber surfaces may be bare or coated with a primer, undercoat, or finish coat. The abrasive compositions of this invention may be used on any coatings known to those of skill in the art, including, for example, paints (e.g., acrylic or urethane), varnishes, lacquers, and the like.

In certain embodiments the paste and/or gel formulations optionally include a suspension agent to keep the particulate abrasive(s) suspended/dispersed in the gel or paste and/or to impart viscosity to the formulation. When desired, essentially any water soluble thickener can act as a suitable suspension agent. However, preferred suspension agents are easily washed off of the underlying surface without leaving a residual film that may interfere with subsequently applied coatings or the modified wetting properties of the surface. Certain desirable suspension agents form a gel, foam, or a paste that is easily removed with water. Thickening agents are well known to those of skill in the art and include natural product thickeners such as cellulose, cellulose derivatives (e.g., hydroxycellulose, methylcellulose, hydroxyethylcellulose, hydroxymethylcellulose, etc.), starch or modified starches, dextrins, and the like.

In certain embodiments various natural and synthetic clay type suspension agents can also be used. Suitable natural clays include attapulgite and bentonite. An example of a synthetic clay is an inorganic complex silicate clay. Several grades of synthetic clay are available as LAPONITE™ (e.g., from Laporte Industries Limited). Other useful suspending agents are the finely divided hydrophobicly treated clays such as a reaction product of a clay, such as a bentonite, hectorite or Laponite, with, for example, dimethyldisteryl ammonium chloride. These suspending agents are the hydrophobically treated montmorillonite or hectorite clays available under the tradename BENTONE® which are prepared by reacting a clay such as bentonite or hectorite in a cation exchange system with a variety of amines. Different amines are reacted to obtain different BENTONE® suspending agents which may also differ in proportions of $SiO_2$, MgO and $AlO_3$. Examples of useful BENTONE® suspending agents are Bentone-27 which is a stearaluminum hectorite, Bentone-34 which is a quatemium 18 bentonite, Bentone-38 which is a quaternium 18 hectorite and Bentone-14 which is a clay extended quatemium 18 hectorite, all of which have a particle size of below about 5 microns and are commercially available.

In certain embodiments thickeners (suspension agents) include various polymer or polymer emulsion thickeners such as silicone based thickeners, acrylic emulsion thickeners (e.g., CARBOPOL® EP1, CARBOPOL® 1324, etc.) and acrylic copolymers (e.g., CARBOPOL® EZ-1, CARBOPOL® EZ-3) and the like.

The amount of suspension agent in the abrasive composition is variable, however, in certain embodiments, when present, the amount of suspension agent is adjusted to provide a paste, or a gelatinous or foam-like consistency. In a preferred embodiment, the thickener can be present at about 0.1% to about 10%, preferably at about 0.1% to about 7%. by weight, more preferably at about 0.2% to about 5%, by weight of the total composition. Typically, clay and polymer thickeners are preferably present at a lower concentration (e.g., about 1.5% to about 3%, by weight) than polymer emulsions (e.g., about 6% to about 7%, by weight).

Other Components.

In various embodiments the water-beading and/or water-sheeting formulations additionally include other agents such as drying agents (e.g., alcohols), foam height stabilizers, cleaning agents (e.g., detergents and/or soaps, ammonia, etc.), humectants, colorants, and the like.

In various embodiments the formulations described herein, can optionally include one or humectants. Humectants are well known to those of skill in the art. In certain embodiments the humectant(s) include, but are not limited to glycols (e.g. polyethylene glycol 400), propylene glycol, glycerine, polyglycerine, and the like.

In various embodiments foam height stabilizers may also be present in the formulations described herein. Suitable foam height stabilizers include, but are not limited to fatty acid amides alkanolamides, more particularly fatty acid amides such as Ninol, Maypon, Sarkosyl, Igepon, Hallcomid, Acrawax, Kemamide, Ethomid, and the like.

When an alcohol is present, the alcohol is typically a water soluble alcohol is used. The alcohol can act as a drying agent and/or a cleaning agent, as an additional wetting agent, and as a biocide/preservative.

Suitable alcohols include, but are not limited to various straight chain alcohols (e.g. propanol, methanol, ethanol, etc.) and/or various aliphatic polyols such as water soluble alcohols up to octanol. The alcohol(s), when present, are typically present in a range from about 0 weight percent to about 20 weight percent, preferably from about 0.1 weight percent to about 10 weight percent, more preferably from about 0.2 weight percent to about 5 weight percent, and most preferably from about 3 to about 4 weight percent of the aqueous formulation as it is ready for application to a surface.

These additional components are intended to be illustrative and not limiting. Using the teaching provided herein additional components will be known to those of skill in the art.

Formulation Preparation and Use

The water-beading and water-sheeting formulations described herein are readily prepared simply by mixing/dissolving the principle active ingredient(s) in water. Similarly additional components (e.g., surfactants, detergents, alcohols, and the like) are mixed into the solution.

In various embodiments the formulations are prepared as concentrates that can be diluted (e.g. with water) prior to end use. Various suitable concentrates include, but are no limited to 2-fold, 4-fold, 5-fold, 10-fold, 20-fold, or 50-fold concentrates.

In certain embodiments the formulations are prepared as a windshield washing fluid for use in an automobile. In certain embodiments the formulations are prepared as glass and tile cleaners for use in bathrooms or other applications.

Typically, the surfaces need no special preparation prior to application of the water-beading or water-sheeting formulations. In various embodiments, however, the surface is cleaned prior to application of the formulation. Thus for example, the surface can be scoured with a cleaner (e.g., BON AMI® cleaning powder) to remove foreign matter (e.g., oils, grease, etc.) and then the water-beading or water-sheeting formulation is applied.

The formulation(s) can be applied to the surface using any convenient means, e.g. spray bottle, sponge, mop, wipe, squee-gee, etc. In certain embodiments the formulations are provided in the windshield cleaning solution of a motor vehicle, in a cleaning solution dispenser and the like.

EXAMPLES

The following examples are offered to illustrate, but not to limit the claimed invention.

Example 1

Water Beading Formulation

One illustrative "water-beading" formulation was formulated by mixing an aqueous solution of components as listed in Table 3.

The resulting formulation was applied to a test glass surface using an aerosol 'trigger' spray nozzle.

TABLE 3

Illustrative water-beading formulation.

| Ingredient | Function | percentage per unit a/r | as received |
|---|---|---|---|
| Alzo International, Foamquat 2IAE | active ingredient | 0.077% | 65.00% |
| Uniqema - ICI, G-263 Secondary surfactant optional | quaternary surfactant | 0.114% | 35.00% |
| H2O | | 99.809% | 0.00% |
| total solids | | 100.000% | |

Panels (6 in square black glossy ceramic bathroom tile and 12 in square mirrored glass) were wet with water and scrubbed to assure cleanliness using Ajax brand household cleanser and a paper towel. Panels were then thoroughly rinsed with water and allowed to air dry. For each product tested 0.5% as received solutions were made with water making up the balance. Panels were positioned near vertical, each solution was poured over a clean panel so that the surface was completely immersed and allowed to stand for 10 seconds. The panel was then rinsed with water for 5 seconds and notes were taken as to the speed and degree of repellency of the surface. WINDEX® brand window cleaner was then applied from a spray bottle to the surface and allowed to stand for 10 seconds, followed by 5 seconds of water rinse. If water ran off the panel quickly and completely without leaving a thin film of water behind it, the panel was considered to be "water repellent". If the panel was deemed repellent, the test was repeated up to 4 cycles in total.

TABLE 4

Comparison of monoquat versus polyquat chemistries.

| | coverage | speed (s) | 1st cycle | 2nd cycle | 3rd cycle | 4th cycle | notes |
|---|---|---|---|---|---|---|---|
| Monoquat - Ceramic Tile | | | | | | | |
| 1 Dodecylpyridinium chloride hydrate | 0% | none | | | | | this chemical does not create repellency on ceramic tile |
| Arquad T-50, Akzo Nobel | 100% | 3 | no repellency | | | | all signs of repellency gone after 1 cycle |
| Arquad 18/50, Akzo Nobel | 95% | 4 | no repellency | | | | all signs of repellency gone after 1 cycle |
| Polyquat - Ceramic Tile | | | | | | | |
| Corsiquat DT 50, Corsicana Technologies | 100% | 3 | speed 7 seconds, coverage 95% | speed 11 seconds, coverage 80% | speed 14 seconds, coverage 75% | speed 15 seconds, coverage 70% | |
| Duoquad T-50, Akzo Nobel | 100% | 3 | speed 6 seconds, coverage 100% | speed 8 seconds, coverage 95% | speed 12 seconds, coverage 90% | speed 16 seconds, coverage 80% | |
| Foamquat 2 IAE, Alzo, Inc. | 95% | 3 | speed 3 seconds, coverage 100% | speed 4 seconds, coverage 100% | speed 7 seconds, coverage 95% | speed 7 seconds, coverage 90% | wet out of surface incomplete on application of chemical solution. Initial applications of detergent allowed for better coverage |
| Monoquat - Mirrored Glass | | | | | | | |
| 1 Dodecylpyridinium chloride hydrate | 0% | none | | | | | this chemical does not create repellency on glass |
| Arquad T-50, Akzo Nobel | 100% | speed 6 seconds | no repellency | | | | all signs of repellency gone after 1 cycle |
| Polyquat - Mirrored Glass | | | | | | | |
| Duoquad T-50, Akzo Nobel | 100% | speed 4 seconds, coverage 95% | speed 10 seconds, coverage 95% | speed 17 seconds, coverage 95% | speed 23 seconds, coverage 95% | speed 27 seconds, coverage 90% | |
| Foamquat 2 IAE, Alzo, Inc. | 90% | speed 5 seconds, coverage 95% | speed 5 seconds, coverage 100% | speed 8 seconds, coverage 95% | speed 12 seconds, coverage 95% | speed 18 seconds, coverage 90% | wet out of surface incomplete on application of test chemical solution. Initial application of detergent allowed for better coverage |

Detergent - Windex (challenges adhesion of the molecular chain) Water Rinse - Tap water dispensed under moderate pressure from a hand held lab sink spray head nozzle. Coverage - Indicates what percentage of the test panel surface area repels water Speed - Indicates how fast water sheds completely off of panel (indicated in seconds).

Table 4 provides evidence that polyquat chemistry is far more durable than monoquat chemistry in this context.

Example 2

Water-Sheeting Formulation

One illustrative "water-sheeting" formulation was formulated by mixing an aqueous solution of components as listed in Table 5. The formulation was applied to window panes on a house. The window panes still show water-sheeting properties more than two years after application.

TABLE 5

Illustrative water-sheeting formulation.

| Ingredient | | percentage per unit |
|---|---|---|
| National Starch and Chemical Co., Cato 237 | modified starch | 2.000% |
| Tomah Products, Tomadol 91-6 | surfactant | 8.000% |

TABLE 5-continued

Illustrative water-sheeting formulation.

| Ingredient | | percentage per unit |
|---|---|---|
| Ammonia Hydroxide | optional base surfactant/foam height | 2.500% |
| Stepan, Ninol 30 LL | stabilizer | 2.000% |
| Rhodia, Antarox RA-40 | optional surfactant | 0.000% |
| Propylene Glycol | humectant | 1.000% |
| H2O | | 84.500% |
| total | | 100% |

Table 5 defines an example of a concentrate, as such could be applied with a metered adjustable spray apparatus commonly found in lawn and garden applications for dispensing 'lawn food' or weed killer type products when attached to a water hose. Typical reduction for concentrate would be approximately 50 grams per gallon of water.

In certain tests, a framed window glass was used in a near vertical position as the test substrate. Glass was masked/ blocked down the vertical middle and a working strength composition was applied to one side of the glass and left to stand for approximately 10 seconds. The window was then thoroughly rinsed with water and allowed to dry. An oil and carbon black mixture was very lightly poured onto both sides of glass and lightly wiped around with a paper towel. Water from a hose was then run over the glass in a waterfall fashion. The oil composition was removed from the treated side of the glass much faster and more completely vs. the non treated side. Further, in most cases on the non treated side the oil could not be removed with water alone regardless of rinse duration.

After application, the soiling material was readily rinsed off of the underlying glass surface using only a water wash.

Example 3

Acidic Formulations

In certain embodiments acidic formulations were also compounded. Acidic versions of many of the formulations were found to have no negative effect on the performance of the compositions. Accordingly, the technology was applicable to the currently popular acidic versions of many product categories i.e. Windex Vinegar, bathroom cleaners, and like. Table 6 illustrates various acidic formulations.

TABLE 6

Illustrative acidic formulation.

| Ingredient | % Active Ingredient | Range percentage per unit | illustrative preferred percentage per unit |
|---|---|---|---|
| H2O DI | | remainder | 99.400% |
| National Starch, Cato 237 | 100% | 0.010%-5% or 10% | 0.200% |
| Tomah, Tomadol 91-6 | 100% | 0.10%-5% | 0.100% |
| Citric Acid | 100% | 0.10%-5% | 0.200% |
| Rohm and Haas, Kathon CG 1.5 | 1.5% | | 0.100% |
| total | | | 100.000% |

Example 4

"Green" Formulations

In various embodiments sugar ester-based surfactants (e.g., alkyl polyglucosides) are used to prepare "green" formulations. A line of Cognis Corporation Sugar Ester based "green" surfactants including Glucopon 225DK, 425N and 625UP were obtained for compatibility testing. Illustrative formulations are provided in Table 7.

TABLE 7

Illustrative "green" formulation.

| Ingredient | % Active | Range Percentage per unit | Illustrative Percentage per unit |
|---|---|---|---|
| H2O DI | | remainder | 99.560% |
| National Starch, Cato 237 | 100% | 0.10%-5% | 0.100% |
| Cognis Corp, Glucopon 225DK | 70% | 0.10%-5% | 0.140% |
| Ammonia | | 0.0%-10% | 0.100% |
| Rohm and Haas, Kathon CG 1.5 | 1.5% | | 0.100% |
| total | | | 100.000% |

Example 5

Soft-Scrub™

Various paste formulations provide a method of modifying a surface while abrading contaminates away and/or adding "tooth" for mechanical adhesion. One paste formulation illustrated in Table 8 provided a good way to scrub clean a surface and deposit the sheeting at the same time, such as on ceramic bathroom tiles, stainless steel, aluminum, glass and the like.

TABLE 8

Illustrative paste formulation.

| Ingredient | % active | Range | Illustrative Percentage per unit |
|---|---|---|---|
| H2O DI | | | 48.750% |
| National Starch, Cato 237 | 100% | 0.010%-10% | 0.750% |
| Tomah, Tomadol 91-6 | 100% | 0.010%-5% | 0.500% |
| abrasive (e.g. Calcium Carbonate) | 100% | 1% or 5%-75% | 50.000% |
| Union Carbide, Cellosize | 100% | 0%-2% | 0.2% |
| Kathon CG 1.5 | 1.5% | 0.1% | 0.1% |
| total | | | 100.000% |

Example 6

Contact Angle Measurements

A Cahn Dynamic Contact Angle Analyzer (DCA) was used to determine contact angles of distilled water on untreated glass plates and glass plates treated with WATERSLIDE™ (see, Table 9) or DUROCLEAN™ (see, Table 10). The DCA raises the liquid to be characterized (contained in a beaker) until it detects contact with a solid glass probe, which is hanging from an electrobalance. The electrobalance produces a record of the change of weight per unit of length as the solid probe advances and recedes in the liquid sample. From this record the surface properties at the liquid/solid interface were calculated.

The contact angle is the angle the liquid surface makes with the solid support. The contact angle is a thermodynamic quantity that characterizes the interaction between a solid and a liquid surface at the interface. A hydrophobic (water repelling) surface yields a higher contact angle. A hydrophilic (water attracting) surface yields a lower contact angle.

TABLE 9

Formulation for WATERSLIDE ™.

| Ingredient | active | percentage |
|---|---|---|
| Alzo International, Foamquat 2 IAE | 65.00% | 0.077% |
| Uniqema - ICI, G 263 | 35.00% | 0.114% |
| H2O | 0.00% | 99.809% |
| total solids | | 100.000% |

TABLE 10

Formulation for DUROCLEANTM 91-6 RTU.

| Ingredient | active | percentage per unit |
|---|---|---|
| H2O DI | | 99.6000% |
| National Starch, Cato 237 | 100% | 0.200% |
| Tomah, Tomadol 91-6 | 100% | 0.100% |
| Kathon CG 1.5 | 1.5% | 0.100% |
| total solids | | 100.0000% |

Sample Preparation

Prior to use the glass plates were rinsed with isopropyl alcohol, allowed to dry and briefly flame cleaned in a butane flame and allowed to cool to room temperature.

Each test sample was applied to the glass plate by immersing the plate in the solution, removing the plate from the solution and allowing to dwell for 30 seconds before rinsing with distilled water. The treated glass plate was allowed to air dry before use. The results of contact angle measurements are shown in Table 11.

TABLE 11

Contact angle measurements for untreated glass, DUROCLEAN ™, and WATERSLIDE ™ formulations.

| Sample | Contact Angle Measurement #1 | Contact Angle Measurement #2 | Contact Angle Measurement #3 | Average Contact Angle |
|---|---|---|---|---|
| Untreated Glass | 25.4 | 17.51 | 29.29 | 24.07 |
| DuroClean treated glass | 5.67 | 7.51 | 10.39 | 7.86 |
| Waterslide treated glass | 79.25 | 74.64 | 71.38 | 75.09 |

Conclusions:

Glass panels treated with DUROCLEAN™ are more hydrophilic (water attracting) than untreated glass. Glass panels treated with WATERSLIDE™ are more hydrophobic (water repelling) than untreated glass It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of modifying the wetting properties of an anionic surface, said method comprising contacting said surface with an aqueous composition comprising a water miscible or water soluble polyquaternary ammonium compound compromising hydrophobic groups whereby said polyquaternary ammonium compound durably attaches to said anionic surface and imparts water repellency to said surface, and wherein the modified wetting properties of said anionic surface remain substantially unchanged after washing with an ammonia-based glass cleaner.

2. The method of claim 1, wherein the modified wetting properties of said anionic surface remain substantially unchanged after at least 5 standard washes.

3. The method of claim 1, wherein the modified wetting properties of said anionic surface remain substantially unchanged after at least 10 standard washes.

4. The method of claim 1, wherein said reduced wettability is characterized by increased beading of water applied to the modified surface as compared to beading of water applied to the unmodified surface.

5. The method of claim 1, wherein said anionic surface is a surface selected from the group consisting of a glass surface, a ceramic surface, a clay surface, a metal surface, a mineral or stone surface, an oxidized plastic surface.

6. The method of claim 1, wherein said anionic surface is a glass surface.

7. The method of claim 6, wherein said anionic surface is a glass surface comprising a window, a windshield, an airplane canopy, or an optical lens.

8. The method of claim 1, wherein said composition compromises an aqueous solution or mixture of said polyquaternary ammonium compound.

9. The method of claim 8, wherein said polyquaternary ammonium compound comprises a diquatenary ammonium compound.

10. The method of claim 8, wherein said polyquaternary ammonium compound comprises a triquatenary ammonium compound.

11. The method of claim 8, wherein said polyquaternary ammonium compound comprises a tetraquatenary ammonium compound.

12. The method of claim 8, wherein said solution or mixture is clear.

13. The method of claim 8, wherein said solution or mixture further includes a detergent.

14. The method of claim 8, wherein said solution or mixture has a pH in the range of from between 6.0 to 9.0.

15. The method of claim 8, wherein said polyquaternary ammonium compound comprises a fatty polyquaternary ammonium compound.

16. The method of claim 8, wherein said polyquaternary ammonium compound comprises $C_4$-$C_{30}$ hydrophobic group.

17. The method of claim 8, wherein said polyquaternary ammonium compound comprises $C_8$-$C_{23}$ hydrophobic group.

18. The method of claim 8, wherein said polyquaternary ammonium compound comprises a diquaternary ammonium compound having the formula:

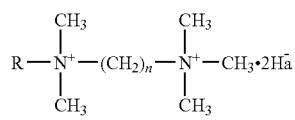

where n is 1, 2, 3, 4, 5, or 6;

Ha- is a counterion; and

R is selected from the group consisting of a $C_8$-$C_{22}$ alkyl, a $C_8$-$C_{22}$ perfluoralkyl, a tallow, a tallow derivative, a siloxane, and an alkylsilane.

19. The method of claim 18, wherein said compound comprises tallowalkylpentamethyl propylenediammonium dichloride.

20. The method of claim 8, wherein said polyquaternary ammonium compound comprises a compound having the formula:

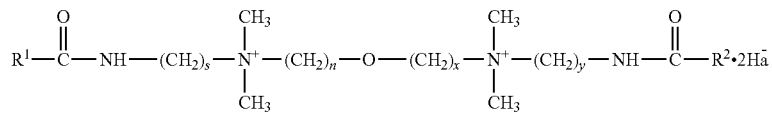

where
- s, n, x, and y are independently 1, 2, 3, 4, 5, or 6;
- Ha is a counterion; and
- $R^1$ and $R^2$ are independently selected from the group consisting of a stearyl, a $C_8$-$C_{22}$ alkyl, a $C_8$-$C_{22}$ perfluoralkyl, a tallow, a tallow derivative, a siloxane, and an alkylsilane.

21. The method of claim 20, wherein said compound comprises N-ethyl ether-bis-1,4(N-isostearylamidoproply-N,N-dimethyl ammonium chloride).

22. The method of claim 8, wherein said polyquaternary ammonium compound is selected from the group consisting of tallowalkylpentamethyl propanediammonium dichloride, and bis isostearamidopropyl ethoxyethyl dimoniium chloride.

23. The method of claim 8, wherein said polyquaternary ammonium compound comprises a substituted polyquaternary ammonium compound, where the substituent is a polyethylene oxide.

24. The method of claim 8, wherein said polyquaternary ammonium compound comprises a bis isostearamidopropyl ethoxyethyl dimoniium chloride.

25. The method of claim 1, wherein said composition comprises about 0.001% to about 10% said polyquaternary ammonium compound.

26. The method of claim 25, wherein said composition comprises less than about 1% of said polyquaternary ammonium compound.

27. The method of claim 25, wherein said composition further comprises an additional surfactant.

28. The method of claim 25, wherein said composition further comprises a detergent and/or an alcohol.

29. The method of claim 25, wherein said composition further comprises a colorant.

30. The method of claim 1, wherein said surface does not comprise the surface of a hair or skin, a textile, or a paper or cardboard.

31. The method of claim 1, wherein said composition is applied to a glass surface in a vehicle by delivery through a windshield washing system.

32. The method of claim 1, wherein said composition is applied to a glass surface of a building.

33. A method of modifying the wetting properties of an anionic surface, said method comprising contacting said surface with an aqueous composition comprising a cationic polysaccharide whereby said cationic polysaccharide compound durably attaches to said anionic surface and increases the wettability of said anionic surface.

34. The method of claim 33, wherein said cationic polysaccharide is selected from the group consisting of a cationic starch, a cationic dextrin, a cationic cellulose, and a cationic galactomannan gum.

35. The method of claim 33, wherein said cationic polysaccharide comprises a cationic starch or dextrin.

36. The method of claim 33, wherein said cationic polysaccharide comprises a cationic starch.

37. The method of claim 34, wherein said cationic polysaccharide is selected from the group consisting of cationic amylopectin,2 hydroxy-3-trimethylammonium orpyl ether chloride (National Starch Cato 237), Guar Hydroxypropyltrimonium Chloride (Rhone Poulenc Jaguar C-17), cationic amylopectin,2 hydroxy-3-trimethylammonium orpyl ether chloride (National Starch Cato 237), and cationic cellulose (CelQuat H-100).

38. The method of claim 33, wherein the modified wetting properties of said anionic surface remain substantially unchanged after at least 5 standard washes.

39. The method of claim 33, wherein the modified wetting properties of said anionic surface remain substantially unchanged after at least 10 standard washes.

40. The method of claim 33, wherein said increased wettability is characterized by increased sheeting and/or more uniform sheeting of water applied to the modified surface as compared to sheeting of water applied to the unmodified surface.

41. The method of claim 33, wherein said anionic surface is a surface selected from the group consisting of a glass surface, a ceramic surface, a clay surface, a metal surface, a mineral or stone surface, and an oxidized plastic surface.

42. The method of claim 33, wherein said anionic surface is a glass surface.

43. The method of claim 33, wherein said anionic is a glass surface comprising a window, a windshield, an airplane canopy, or an optical lens.

44. The method of claim 35, wherein said composition compromises an aqueous solution or mixture of said cationic polysaccharide.

45. The method of claim 33, wherein said composition compromises an aqueous solution or mixture of said cationic polysaccharide and said cationic polysaccharide comprises 0.01 to about 10% of said composition.

46. The method of claim 45, wherein said composition further comprises a surfactant that comprises less than about 20% of said composition.

47. The method of claim 45, wherein said composition further comprises a pH adjuster.

48. The method of claim 47, wherein said pH adjuster is a base.

49. The method of claim 33, wherein said composition comprises:
- a cationic starch or dextrin;
- a surfactant; and
- a pH adjuster.

50. The method of claim 49, wherein said cationic starch or dextrin comprises about 0.01 to about 3% of said composition.

51. The method of claim 49, wherein said surfactant comprises less than about 0.3% of said composition.

52. The method of claim 49, wherein said pH adjuster is a base.

53. The method of claim 49, wherein said pH adjuster sets the pH of said composition from about pH 8 to about pH 12.

54. The method of claim 33, wherein said composition further comprises a detergent and/or an alcohol.

55. The method of claim 33, wherein said composition further comprises a colorant.

56. The method of claim 33, wherein said surface does not comprise the surface of a hair or skin, a textile, or a paper or cardboard.

57. A composition for modifying the wetting properties of an anionic surface, said composition comprising an aqueous mixture or solution comprising:
   a cationic polysaccharide;
   a surfactant; and
   a pH adjuster.

58. The composition of claim 57, wherein said pH adjuster is a base.

59. The composition of claim 57, wherein said pH adjuster is an acid.

60. The composition of claim 57, wherein said composition further comprises an abrasive.

61. The composition of claim 60, wherein said abrasive comprises calcium carbonate, pumice, or feldspar.

62. The composition of claim 57, wherein said composition further comprises a colorant and/or an alcohol.

63. An article of manufacture comprising an anionic surface having durably attached thereto a water soluble or water miscible cationic polysaccharide, whereby said polysaccharide increases the wettability of said anionic surface.

64. The article of manufacture of claim 63, wherein said cationic polysaccharide comprises a cationic starch and/or a cationic dextrin.

65. An article of manufacture comprising an anionic surface having durably attached thereto a water miscible or water soluble polyquaternary ammonium compound compromising hydrophobic groups whereby said polyquaternary ammonium compound durably attaches to said anionic surface and reduces the wettability of said anionic surface, wherein the modified wetting properties of said anionic surface remain substantially unchanged after at least 5 standard washes.

66. The article of manufacture of claim 65, wherein the modified wetting properties of said anionic surface remain substantially unchanged after at least 10 standard washes.

67. The article of manufacture of claim 63, wherein said anionic surface is a surface selected from the group consisting of a glass surface, a ceramic surface, a clay surface, a metal surface, a mineral or stone surface, and an oxidized plastic surface.

68. The article of manufacture of claim 67, wherein said anionic surface comprises a glass surface.

69. The article of manufacture of claim 67, wherein said anionic surface is a glass surface comprising a window, a windshield, an airplane canopy, or an optical lens.

70. The article of manufacture of claim 67, wherein said anionic surface comprises a metal, a metal oxide, a pigment, an oxidized plastic.

71. A water sheeting glass cleaner, said glass cleaner comprising an aqueous mixture, solution, or suspension comprising:
   a cationic polysaccharide;
   a surfactant; and
   an alcohol; and
   ammonia.

72. A method of cleaning a glass, ceramic, or mirrored surface, said method comprising:
   contacting said surface with a cleaner according to claim 71; and
   removing said cleaner and associated soiling of said surface.

73. The method of claim 72, wherein said removing comprises a method selected from the group consisting of sponging, rinsing, squee-geeing, or toweling.

74. A method of preparing a metal surface for application of a paint or other overcoating, said method comprising:
   contacting said surface with a composition according to claim 57, whereby the wettability of said surface is increased.

75. The method of claim 74, further comprising applying an overcoating to said surface.

76. A method of stabilizing an activated plastic surface for subsequent application of a coating material, said method comprising:
   contacting said activated plastic surface with a composition according to claim 57 whereby the wettability of said surface is increased.

77. The method of claim 76, further comprising applying an overcoating to said activated plastic surface.

* * * * *